United States Patent [19]
Wallace et al.

[11] Patent Number: 5,319,924
[45] Date of Patent: Jun. 14, 1994

[54] PARTIAL OXIDATION POWER SYSTEM

[75] Inventors: Paul S. Wallace, Katy; Pradeep S. Thacker, Houston, both of Tex.

[73] Assignee: Texaco Inc., White Plains, N.Y.

[21] Appl. No.: 52,961

[22] Filed: Apr. 27, 1993

[51] Int. Cl.$^5$ .............................................. F02C 6/00
[52] U.S. Cl. ................................. 60/39.02; 60/39.182
[58] Field of Search ................. 60/39.02, 39.05, 39.12, 60/39.182

[56] References Cited

U.S. PATENT DOCUMENTS

| | | | |
|---|---|---|---|
| 3,232,728 | 2/1966 | Reynolds | 48/215 |
| 3,544,291 | 12/1970 | Schlinger et al. | 48/206 |
| 3,688,438 | 9/1972 | Slater et al. | 48/215 |
| 3,868,817 | 3/1975 | Marion et al. | 60/39.12 |
| 4,007,786 | 2/1977 | Schlinger | 60/39.02 |
| 4,052,176 | 10/1977 | Child et al. | 55/32 |
| 4,075,831 | 2/1978 | McGann | 60/39.05 |
| 4,121,912 | 10/1978 | Barber et al. | 60/39.02 |
| 4,132,065 | 1/1979 | McGann | 60/39.182 |
| 4,178,758 | 12/1979 | Paull et al. | 60/39.12 |
| 4,184,322 | 1/1980 | Paull et al. | 60/39.02 |
| 4,202,167 | 5/1980 | Suggitt et al. | 60/39.02 |
| 4,261,167 | 4/1981 | Paull et al. | 60/39.02 |
| 4,351,645 | 9/1982 | Marion et al. | 48/61 |
| 4,377,132 | 3/1983 | Koog et al. | 122/7 R |
| 5,230,211 | 7/1993 | McMahon et al. | 60/39.02 |

Primary Examiner—Richard A. Bertsch
Assistant Examiner—Howard R. Richman
Attorney, Agent, or Firm—George J. Darsa

[57] ABSTRACT

Chlorine and sulfur-free fuel gas substantially comprising $H_2+CO$ for use as fuel in a gas turbine for the production of mechanical and electrical power and environmentally-safe flue gas is produced by the partial oxidation of liquid hydrocarbonaceous or solid carbonaceous fuels having chlorine and sulfur-containing impurities, cooling and splitting the raw fuel gas into two streams A and B, separately cooling raw fuel gas stream A by indirect heat exchange with dry $N_2$ gas while separately cooling the stream of raw fuel gas B by indirect heat exchange with the product stream of clean chlorine and sulfur-free fuel gas. HCl and particulate matter are then removed from raw fuel gas streams A and B; and, after combining raw fuel gas streams A and B together further cooling and removal of sulfur-containing gases takes place. By this process, attack on metal heat exchangers by the corrosive constituents in the raw fuel gas is prevented. In one embodiment, the clean chlorine and sulfur-free fuel gas is humidified and burned in the gas turbine to produce increased power and efficiency without polluting the atmosphere.

16 Claims, 2 Drawing Sheets

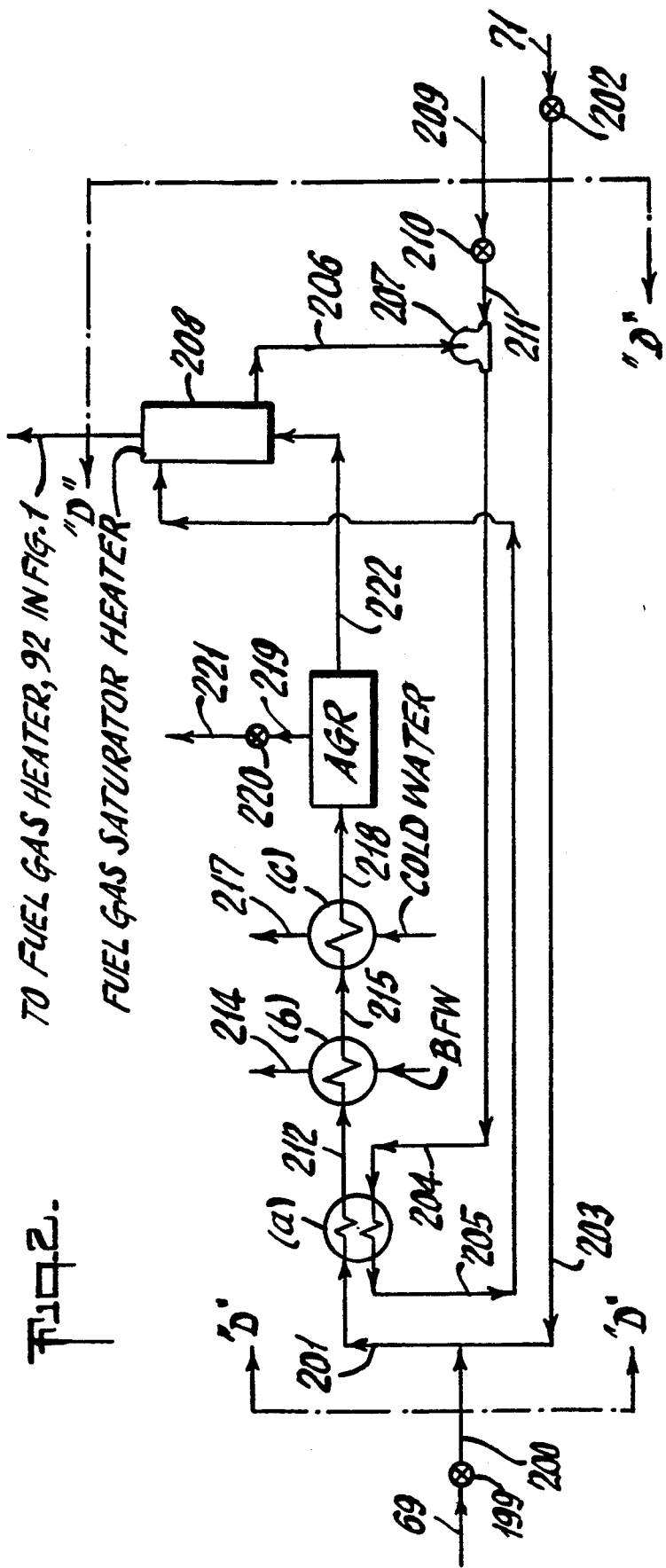

PARTIAL OXIDATION POWER SYSTEM

BACKGROUND OF THE INVENTION

1. Field of The Invention

This invention relates to the production of fuel gas by the partial oxidation of sulfur and chlorine-containing liquid hydrocarbonaceous or solid carbonaceous fuels, purifying the fuel gas, and burning it in a combustion turbine for the production of power and environmentally-safe flue gas.

2. Description of Prior Art

In coassigned U.S. Pat. No. 3,868,817 fuel gas having a mole ratio ($CO/H_2$) dry basis of at least 0.30 is produced by partial oxidation in the presence of a $CO_2$-rich temperature moderator. After further processing, the fuel gas is burned in a combustion turbine. Production of fuel gas by partial oxidation of a hydrocarbonaceous fuel using comparatively high steam to fuel weight ratios and no subsequent catalytic methanation step is described in coassigned U.S. Pat. No. 3,688,438. In coassigned U.S. Pat. No. 4,075,831 purified and humidified fuel gas is burned in a gas turbine to produce mechanical work and electrical energy. A mixture of air-/steam is mixed with fuel and burned to drive a gas turbine in U.S Patent No. 4,537,023. However, the prior art does not teach or suggest the instant invention which provides the steps of cooling chlorine and sulfur-containing raw fuel gas in a radiant cooler and splitting said raw fuel gas into two streams A and B; further cooling said stream of raw fuel gas A by indirect heat exchange with a stream of nitrogen gas, further cooling said stream of raw fuel gas B by indirect heat exchange with a stream of clean chlorine and sulfur-free fuel gas, removing HCl and particulate matter from both streams of raw fuel gas and combining them together, and removing sulfur-containing gases from said combined streams to produce said stream of clean chlorine and sulfur-free fuel gas comprising $H_2+CO$. Nor does the prior art provide the steps of introducing humidified clean chlorine and sulfur-free fuel gas and a separate stream of supplemental dry nitrogen gas into the combustor of a gas turbine where combustion with air takes place and flue gas containing supplementary elemental nitrogen but no chlorine or sulfur-containing or $NO_x$ gases is produced. Increased power and efficiency are obtained without polluting the atmosphere.

SUMMARY

The subject process pertains to the production of fuel gas which is free from chlorine and sulfur-containing corrosive vapors by the partial oxidation of sulfur and chlorine-containing liquid hydrocarbonaceous or solid carbonaceous fuel and burning said fuel gas in a turbo combustor by the following steps:

(1) reacting by partial oxidation a stream of free-oxygen containing gas with a stream of chlorine and sulfur-containing liquid hydrocarbonaceous or solid carbonaceous fuel in the presence of a temperature moderator in the reaction zone of a downflowing vertical free-flow gas generator at a temperature in the range of about 1800° to 3000° F. and above the dew point of $H_2O$ and a pressure in the range of about 1 to 250 atmospheres to produce a stream of raw fuel gas comprising $H_2$, CO, $CO_2$, $H_2O$, $H_2S$, COS, HCl, $CH_4$, $N_2$, and A, along with entrained molten slag and particulate matter; wherein the temperature in said reaction zone is above the dew point of $H_2O$;

(2) cooling said raw fuel gas stream from (1) to a temperature in the range of about 1500° to 1,000° F. and above the dew point of $H_2O$ by indirect heat exchange with boiler circulating water; and separating out said slag;

(3) splitting the slag-free raw fuel gas stream from (2) into separate gas streams A and B, and separately cooling each raw fuel gas stream A and B to a temperature in the range of about 1,000° to 600° F. and above the dew point of $H_2O$ by indirect heat exchange with boiler circulating water, thereby producing steam;

(4) passing a stream of dry nitrogen gas at a temperature in the range of about ambient to 400° F. in indirect heat exchange with the raw fuel gas stream A from (3), thereby further cooling said raw fuel gas stream A to a temperature in the range of about 600° to 300° F. and above the dew point of water in said raw fuel gas stream A while heating the nitrogen gas stream to a temperature in the range of about 400° to 800° F.;

(5) scrubbing the stream of raw fuel gas A that was cooled in (4) with water to produce a clean chlorine-free stream of fuel gas;

(6) further cooling the raw fuel gas stream B from (3) to a temperature in the range of about 600° to 300° F. and above the dew point of water in said raw fuel gas stream B by indirect heat exchange with a stream of clean chlorine and sulfur-free fuel gas leaving (12) thereby heating said clean chlorine and sulfur-free fuel gas stream to a temperature in the range of about 400° to 800° F.;

(7) scrubbing with water the cooled stream of raw fuel gas B that was cooled in (6) to produce a clean chlorine-free stream of fuel gas;

(8) combining the streams of clean chlorine-fuel gas fuel gas A and B from (5) and (7) respectively;

(9) cooling the combined stream of clean chlorine-free fuel gas from (8) having a temperature in the range of about 250° to 500° F. to a temperature in the range of about 200° to 400° F. by indirect heat exchange with a clean chlorine and sulfur-free stream of fuel gas from (11) having a temperature in the range of about 90° to 120° F.;

(10) further cooling the combined stream of raw fuel gas from (9) to a temperature in the range of about 90° to 120° F. by indirect heat exchange with boiler circulating water and/or cold water in one or more heat exchangers;

(11) removing substantially all of the sulfur-containing gases from the combined stream of clean chlorine-free fuel gas from (10) in an acid-gas removal zone;

(12) heating to a temperature in the range of about 250° to 400° F., said stream of clean chlorine and sulfur-free fuel gas from (9) by indirect heat exchange with steam;

(13) separately introducing the following gaseous streams into the combustion zone of a gas turbine by way of separate lines (a) a stream of air, (b) the stream of dry nitrogen gas heated in (4), and (c) the stream of clean chlorine and sulfur-free fuel gas heated in (6); and

(14) burning said clean chlorine and sulfur-free fuel gas in said combustion zone to produce flue gas substantially free from HCl, sulfur-containing gas, and $NO_x$; passing said flue gas through an expansion turbine to produce power and hot exhaust gas; producing steam by indirect heat exchange of boiler feed water with said hot exhaust gas; and passing said steam through a steam turbine for the production of power.

In another embodiment, prior to (12), the stream of clean chlorine and sulfur-free fuel gas is saturated with water that was preheated by indirect heat exchange with the combined streams of clean chlorine-free fuel gas A and B. In such case, a humidified stream of clean chlorine and sulfur-free fuel gas is burned in the combustion zone in (14) in place of the comparatively dry stream (13) (c).

BRIEF DESCRIPTION OF THE DRAWINGS

The invention will be further understood by reference to the accompanying drawings. The drawing, designated FIG. 2 is a schematic representation of an embodiment of the process providing for water saturated clean chlorine and sulfur-free fuel gas by replacing section "C"—"C" of FIG. 1 with Section "D"—"D" of FIG. 2.

DESCRIPTION OF THE INVENTION

Figure 1:
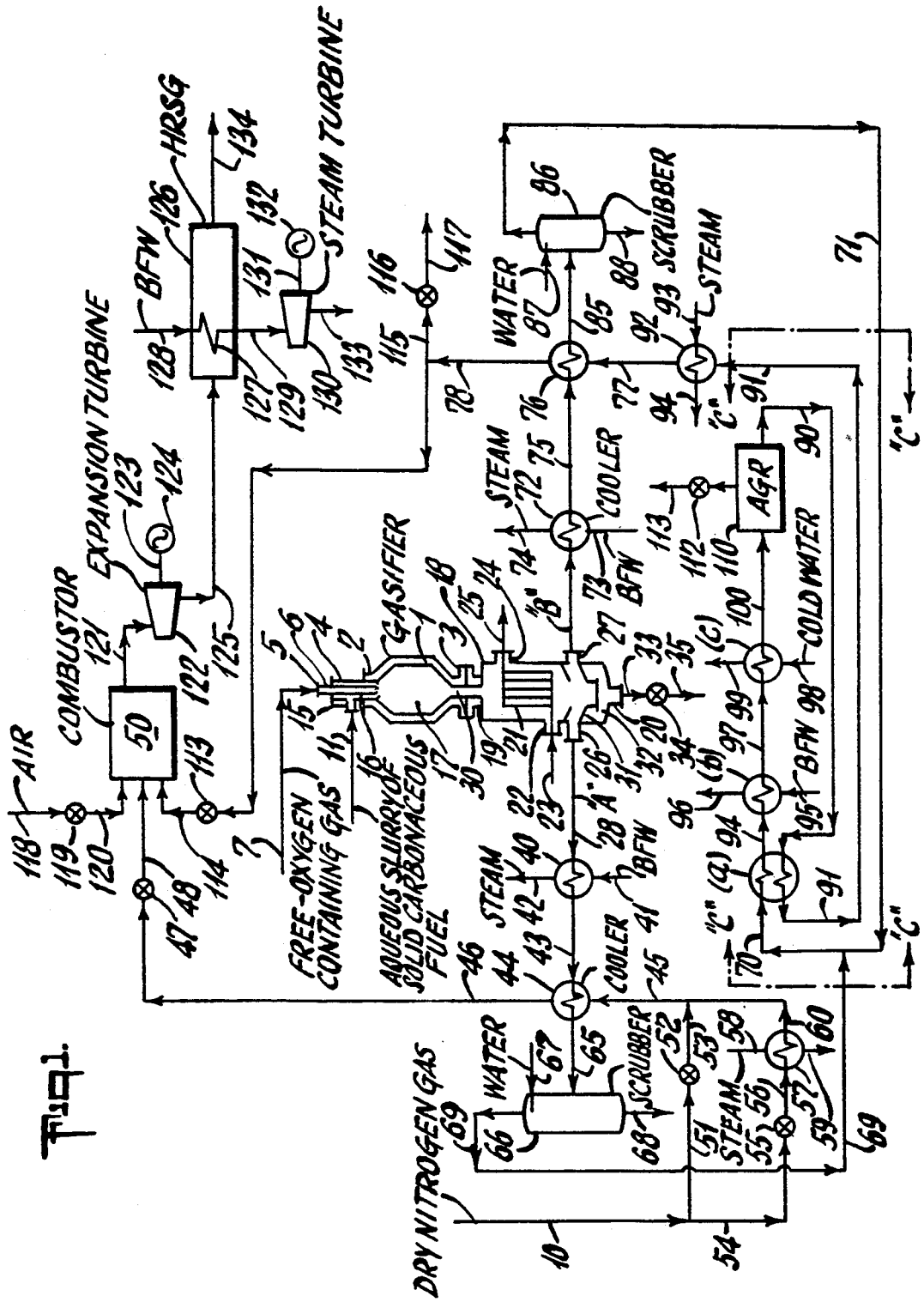
FIG. 1, is a schematic representation of a preferred embodiment of the process.

When liquid hydrocarbonaceous or solid carbonaceous fuels that contain sulfur and chlorine impurities are used as the fuel feed in a conventional partial oxidation process, raw fuel gas is produced at a temperature in the range of about 1800° F. to 3000° F. and comprises a mixture of the following gases: $H_2$, CO, $CO_2$, $H_2O$, $H_2S$, COS, HCl, $CH_4$, $N_2$ and A. It was unexpectedly found that the moisture in the raw fuel gas, if it were cooled below its dew point by a cold exchanging medium, would collect hydrogen chloride from the fuel gas and form a corrosive mist. This mist would attack the metallurgy in the heat exchangers used to cool the raw gas stream. This problem, as well as others, has been resolved by the subject process.

In the subject process, liquid hydrocarbonaceous or solid carbonaceous fuel feedstock that contain about 0.2 to 10 wt. % (dry basis) of sulfur and about 0.001 to 2.0 wt. % (dry basis) of chlorine are reacted by partial oxidation with a free-oxygen containing gas and preferably, substantially pure oxygen and a temperature moderator to produce raw fuel gas. Preferably the reaction takes place without a catalyst.

The feedstreams are introduced into the reaction zone of a conventional free-flow partial oxidation gas generator by means of a conventional burner. The gas generator is a vertical cylindrical steel pressure vessel lined on the inside with a thermal refractory material. A typical partial oxidation gas generator is shown in FIG. 1 and is described in coassigned U.S. Pat. Nos. 2,818,326 and 3,544,291, which are incorporated herein by reference. The burner is located in the top of the gas generator along the central vertical axis. Suitable burners include the tip-atomizing types such as shown in coassigned U.S. Pat. Nos. 2,928,460; 3,847,564; 3,874,592; the pre-mix types such as shown in coassigned U.S. Pat. Nos. 3,874,592; 4,351,645; and 4,364,744, and combinations thereof. These U.S. patents are incorporated herein by reference.

There may be one or more e.g., two streams of oxidant optionally in admixture with a temperature moderator passing simultaneously through the burner. For example, a two stream burner such as shown in coassigned U.S. Pat. No. 3,874,592 may comprise a central conduit surrounded by a spaced concentric coaxial conduit thereby providing an annular passage therebetween. The stream of oxidant optionally in admixture with a temperature moderator may be connected to and pass through the center conduit or the annular passage; and, the fuel stream optionally in admixture with a temperature moderator may be connected to and pass through the remaining passage. In another example, a three-stream burner, such as shown in coassigned U.S. Pat. No. 3,847,564 may comprise a central conduit surrounded by two spaced concentric coaxial conduits that provide intermediate and annular passages therebetween. Separate streams of oxidant optionally in admixture with a temperature moderator may be connected to and pass through the center conduit and the outer annular passage. The stream of fuel optionally in admixture with a temperature moderator may be connected to and pass through the intermediate passage.

The raw liquid hydrocarbonaceous or solid carbonaceous fuels used as feedstock in the subject process contain sulfur and chlorine impurities. Sulfur is present in an amount in the range of about 0.2 to 10.0 wt. % (dry basis) and in the form of the sulfides of iron, zinc, copper-iron, and lead; or as the sulfates of calcium, barium, iron, sodium, and aluminum. Chlorine is also present in an amount in the range of about 10 to 20,000 parts per million (dry basis) and in the form of the chlorides of sodium, potassium, and magnesium.

The term solid carbonaceous fuel as used herein includes coal, such as anthracite, bituminous, subbituminous, coke from coal; lignite; residue derived from coal liquefaction; oil shale; tar sands; petroleum coke; asphalt; pitch; particulate carbon; soot; concentrated sewer sludge; and mixtures thereof. The solid carbonaceous fuel may be ground to a particulate size so that 100% passes through an ASTM E11-70 Sieve Designation Standard (SDS) 1.4 mm Alternative No. 14 and at least 80% passes through an ASTM E11-70 Sieve Designation Standard 0.425 mm (Alternative No. 40).

The solid carbonaceous fuel may be introduced into the gas generator as a dry feed entrained in a gaseous carrier e.g. steam, $N_2$ $CO_2$, fuel gas; or as a pumpable slurry having a solids content in the range of about 25 to 80 wt.%, such as about 45-70 wt. %. Suitable liquid carriers for the solid carbonaceous fuel includes water, liquid hydrocarbonaceous fuel, or mixtures thereof.

The term liquid hydrocarbonaceous fuel as used herein is intended to include various liquid hydrocarbonaceous materials, such as liquefied petroleum gas, petroleum distillates and residua, gasoline, naphtha, kerosene, crude petroleum, asphalt, gas oil, residual oil, tar-sand oil, shale oil, oil derived from coal, aromatic hydrocarbons (such as benzene, toluene, and xylene fractions), coal tar, cycle gas oil from fluid-catalytic-cracking operations, furfural extract of coker gas oil, and mixtures thereof. Included within the definition of liquid hydrocarbonaceous fuel are oxygenated hydrocarbonaceous organic materials including carbohydrates, cellulosic materials, aldehydes, organic acids, alcohols, ketones, oxygenated fuel oil, waste liquids, emulsified heavy oil, and by-products from chemical processes containing oxygenated hydrocarbonaceous organic materials and mixtures thereof.

The term free-oxygen containing gas, as used herein is intended to include air, oxygen-enriched air, i.e., from greater than 21 to 95 mole % oxygen, such as about 50 to 75 mole % oxygen, and substantially pure oxygen, i.e., greater than 95 mole % oxygen (the remainder comprising $N_2$ and rare gases). Free-oxygen containing gas optionally in admixture with a temperature moderator may be introduced into the burner at a temperature in the range of about 32° to 1500° F., depending on its composition. The atomic ratio of free-oxygen in the oxidant to carbon in the feedstock (0/C, atom/atom) is preferably in the range of about 0.6 to 1.5, such as about 0.80 to 1.3. The term oxidant feedstream, as used herein is synonymous with free-oxygen containing gas feedstream.

The use of a temperature moderator in the reaction zone of the gas generator depends in general on the carbon to hydrogen ratio of the feedstock and the oxygen content of the oxidant stream. Suitable temperature moderators include steam, e.g., saturated or superheated, water, $CO_2$-rich gas, liquid $CO_2$, by-product nitrogen from the air separation unit used to produce substantially pure oxygen, and mixtures of the aforesaid temperature moderators. The temperature moderator may be introduced into the gas generator in admixture with either the liquid hydrocarbonaceous fuel feed, the free-oxygen containing stream, or both. Alternatively, the temperature moderator may be introduced into the reaction zone of the gas generator by way of a separate conduit leading to the fuel burner. When $H_2O$ is introduced into the gas generator either as a temperature moderator, a slurrying medium, or both, the weight ratio of $H_2O$ to the liquid hydrocarbonaceous fuel or solid carbonaceous fuel is in the range of about 0.2 to 5.0 and preferably in the range of about 0.3 to 1.0. These ranges are applicable to the other temperature moderators.

The relative proportions of liquid hydrocarbonaceous fuel or solid carbonaceous fuel, water or other temperature moderator, and oxygen in the feed streams to the gas generator are carefully regulated to convert a substantial portion of the carbon in the fuel fed to the partial oxidation gas generator, e.g. about 70 to 100 wt. %, such as about 90 to 99 wt. %, of the carbon to carbon oxides, e.g., CO and $CO_2$, and to maintain an autogenous reaction zone temperature in the range of about 1800° to 3000° F., such as about 2350° to 2900° F. The pressure in the reaction zone is in the range of about 1 to 250 atmospheres, such as about 10 to 200 atmospheres. The time in the reaction zone of the partial oxidation gas generator in seconds is in the range of about 0.5 to 20, such as normally about 1.0 to 5.

The effluent gas stream leaving the partial oxidation gas generator has the following composition in mole % depending on the amount and composition of the feed streams: $H_2$ 8.0 to 60.0; CO 8.0 to 70.0; $CO_2$ 1.0 to 50.0, $H_2O$ 2.0 to 75.0, $CH_4$ 0.0 to 30.0, $H_2S$ 0.1 to 2.0, COS 0.05 to 1.0, HCl 0.0002 to 0.4, $N_2$ 0.0 to 80.0, and A 0.0 to 2.0. Entrained in the effluent gas stream is particulate matter comprising about 0.5 to 30 wt. %, such as about 1 to 10 wt. % of particulate carbon (basis weight of carbon in the feed to the gas generator). Fly ash particulate matter may be present along with the particulate carbon. At temperatures above the melting point of fly ash, molten slag is produced.

The effluent gas stream leaving the reaction zone of the noncatalytic partial oxidation gas generator at a temperature in the range of about 1800° F. to 3000° F. and a pressure in the range of about 1 to 250 atmospheres is passed downward through a radiant cooler. The radiant cooler is a vertical free-flow steel pressure vessel with a central flanged inlet in the upper head that is connected to the central flanged bottom outlet of the vertical gas generator. The central vertical axis of the radiant cooler is a continuation of the central vertical axis of the gas generator, as shown in the drawing, FIG. 1. The hot gas stream passes over a vertical bundle of water cooled tubes in the radiant cooler and is thereby cooled to a temperature in the range of about 1500° F. to 1000° F. and above the dew point of $H_2O$ in the gas stream. Substantially all of the entrained slag separates from the fuel gas in the radiant cooler and drops into a water bath located in the bottom of the radiant cooler vessel. The expressions "slag-free" or "substantially slag-free" raw fuel gas as used herein means less than 2000 parts per million of slag and particulate carbon. Periodically, a slurry of water and slag is removed from the radiant cooler. Water is separated from the slag, purified and recycled to the cooling tubes in the radiant cooler. The slag may be used as land fill. Any suitable radiant cooler may be used. Radiant coolers are shown and described in coassigned U.S. Pat. Nos. 4,377,132 and 4,936,376, which are incorporated herein by reference. At the bottom of the radiant cooler, the partially cooled raw fuel gas is split into two gas streams A and B. Stream A comprises 30 to 70 volume % of the total amount of raw fuel gas produced in the gas generator and stream B comprises the remainder. Preferably, to maximize heat transfer efficiency and minimize cost the volume of raw gas streams A and B are equal. Each gas stream has a temperature in the range of about 1500° F. to 1000° F. The pressure of split gas streams A and B is substantially that in the gas generator less ordinary pressure drop in the lines and equipment, for example, a pressure drop of up to about 10%. The split stream of raw fuel gas A provides a portion of the heat to preheat a stream of nitrogen gas on its way to a combustion turbine. The stream of raw fuel gas B provides a portion of the heat to preheat a stream of clean chlorine and sulfur-free fuel gas which is on its way to said combustion turbine. From the radiant cooler the raw fuel gas stream A is passed through a conventional convection cooler in indirect heat exchange with boiler feed water and cooled to a temperature in the range of about 1000° F. to 600° F., but above the dew point. By keeping the $H_2O$ in the fuel gas passing through the convection coolers in the vapor state, no liquid water is present for the HCl vapor in the raw fuel gas stream to dissolve in. Attack of the metal convection cooler by corrosive HCl acid is thereby prevented. The partially cooled raw fuel gas stream A is then further cooled to a temperature in the range of about 300° F. to 600° F. but above the dew point by indirect heat exchange with nitrogen gas in a conventional convection cooler. The dry nitrogen gas comprises about 90.0 to 100.0 mole % $N_2$. The remainder substantially comprises $H_2O$ and oxygen. The nitrogen gas is delivered to the site at a temperature in the range of about ambient to 400° F. Alternatively, nitrogen gas and substantially pure oxygen are produced at the site in a conventional air separation zone. The oxygen may be used in the system as the oxidant in the partial oxidation gas generator. The dry nitrogen gas is used in the system as a temperature moderator in the combustion turbine. For a description of a typical air separation unit, reference is made to Kirk-Othmer, Encyclopedia of Chemical Technology, Third Edition, Volume 7, John Wiley & Sons, Pages 229 to 231.

Next, the cooled raw fuel gas stream A is scrubbed clean of entrained particulate matter e.g. soot and flyash in a conventional gas scrubber. Any suitable gas scrubbing means may be used. For example, a liquid-gas tray-type column is described in Perry's Chemical Engineers Handbook, Fourth Edition, McGraw-Hill 1963, Pages 18-3 to 5. Reference is also made to the gas scrubber in coassigned U. S. Pat. No. 3,232,728. Simultaneously, substantially all of the chlorine in the raw fuel gas stream A is removed by the scrubbing water. Simultaneously, the split stream of raw fuel gas B provides a portion of the heat to preheat a stream of clean chlorine and sulfur-free fuel gas on its way to said combustion turbine. Thus, raw fuel gas stream B is passed through a conventional convection cooler in indirect heat exchange with boiler feed water and cooled to a temperature in the range of about 1000° F. to 600° F., but above the dew point. The partially cooled raw fuel gas stream is then cooled to a temperature in the range of about 600° F. to 300° F., but above the dew point, by indirect heat exchange with clean chlorine and sulfur-free fuel gas in a conventional convection cooler on its way to said combustion turbine. Next, the raw fuel gas stream B is scrubbed clean of entrained particulate matter e.g. soot and ash in a conventional gas scrubber. Simultaneously, substantially all of the chlorine in the raw fuel gas stream B is removed by the scrubbing water. The expressions herein that "substantially all of the chlorine is removed from the scrubbed raw fuel gas stream" or that this gas stream is "chlorine-free" means that the chlorine content of the water scrubbed raw fuel gas stream A and/or B has been reduced to less than 10 parts per million (ppm). The scrubbing water is maintained at a temperature in the range of about 250° to 450° F. and has a pH in the range of about 6 to 9. A suitable base material for addition to the scrubbing water may be selected from the group consisting of $NH_3$, $NH_4OH$, $NaOH$, $KOH$, $Na_2CO_3$, and $K_2CO_3$.

The streams of scrubbed raw fuel gas A and B are combined and the mixture of raw fuel gas is introduced into a low temperature gas cooling zone and reduced to a temperature in the range of about 90° F. to 120° F. The low temperature gas cooling zone comprises two or more conventional convection coolers; for example, three convection coolers connected in series. More specifically in the low temperature gas cooling zone, the combined stream of scrubbed raw fuel gas A and B at a temperature in the range of about 250° F. to 500° F. is passed through conventional convection cooler (a) in indirect heat exchange with a stream of clean chlorine and sulfur-free fuel gas which leaves a conventional acid-gas removal zone (AGR), to be further described, at a temperature in the range of about 90° F. to 120° F. The clean chlorine and sulfur-free fuel gas is thereby heated in conventional convection cooler (a) to a temperature in the range of about 150° F. to 300° F. Leaving convection cooler (a), the combined stream of scrubbed sulfur-containing raw fuel gas A and B is further cooled in two steps before it is introduced into a conventional acid gas recovery zone where $H_2S$ and COS are removed. In cooling step 1 the combined stream of raw fuel gas A and B is further cooled in conventional convection cooler (b) by indirect heat exchange with boiler circulating water to a temperature in the range of about 120° F. to 250° F. Then in conventional convection cooler (c), the combined stream of raw fuel gas A and B from cooler (b) is further cooled to a temperature in the range of about 90° F. to 120° F. by indirect heat exchange with cold water. Next, in a conventional acid gas removal zone (AGR), substantially all of the sulfur-containing gases e.g. $H_2S$ and COS are removed to produce a stream of clean substantially chlorine and sulfur-free fuel gas at a temperature in the range of about 90° F. to 120° F. and having a heat of combustion of about 150 to 300 BTU/SCF (dry basis). Water may be removed in the AGR zone by cooling the clean chlorine-free fuel gas below the dew point and/or by contacting the fuel gas with a dessicant. For example, see coassigned U. S. Pat. No. 4,052,176, which is incorporated herein by reference, for the removal of sulfur-containing gases from synthesis gas.

In the acid-gas recovery zone (AGR), suitable conventional processes may be used involving refrigeration and physical or chemical absorption with solvents, such as methanol, n-methylpyrrolidone, triethanolamine, propylene carbonate, or alternately with amines or hot potassium carbonate. The $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition, Volume 19 John Wiley 1969 Page 3530. The expression "substantially all of the sulfur-containing gases are removed" or "sulfur-free fuel gas" means that the sulfur content of the water scrubbed raw fuel gas A or B has been reduced to less than 750 parts per million (ppm).

In the preferred embodiment, at least a portion e.g. 10 to 100 volume % of the clean substantially chlorine and sulfur-free fuel gas stream is separately introduced into the combustor of the combustion turbine at a temperature in the range of about 400° F. to 800° F., such as about 300° F. to 500° F. and a pressure in the range of about 150 to 500 psig, such as about 225 to 325 psig. Simultaneously, a stream of air is separately introduced into the combustor at a temperature in the range of about 400° F. to 900° F., such as about 700° F. to 800° F., say 750° F., and a pressure which is substantially the same e.g. ±10% as that of the stream of fuel gas. Simultaneously, a stream of dry nitrogen gas is separately introduced into the combustor at a temperature and pressure which are substantially the same e.g. ±10% as that of the stream of fuel gas. Advantageously, by the subject process, the fuel gas stream and the dry nitrogen gas stream may be introduced into the combustor at a higher temperature e.g. to 800° F. This decreases the fuel input to the combustor (while decreasing the heat input to the steam cycle), making the plant more efficient. The remaining portion of the clean chlorine and sulfur-free fuel gas stream comprising $H_2$+CO may be used for catalytic synthesis of organic chemicals. In one embodiment, a $H_2$-rich stream is produced by catalytic water-gas shifting the CO to $CO_2$ and $H_2$ followed by removing the gaseous impurities.

The volume ratio of dry nitrogen gas to clean chlorine and sulfur-free fuel gas in the combustor is in the range of about 0 5 to 2.0, such as in the range of about 0.75 to 1.5, say about 1.0. Complete combustion takes place in the combustor at a temperature in the range of about 1800° to 2600° F., such as about 2300° F., and at a pressure of about 175 to 250 psig, such as about 220psig. Substantially no chlorine or sulfur-containing gases or $NO_3$ gases are produced or are present in the flue gas. x is an integer in the range of about 1 to 3. By definition, the terms "substantially no" and "substantially reduced amount of $NO_x$ gases" means less than 20 parts per million (ppm), such as in the range of about 16 to 10 ppm, say 10 ppm or less.

The stream of flue gas leaving the combustor is passed through a power-developing expansion turbine as the working fluid. For example, coupled through a variable-speed drive to the axis of the expansion turbine and driven thereby may be at least one electric generator and/or at least one turbocompressor. The addition to the flue gas of the supplemental amount of dry nitrogen increases the mass flow of the flue gas. Heat in the flue gas, which leaves the expansion turbine at a temperature in the range of about 1200° to 800° F. is recovered in a conventional heat recovery steam generator (HRSG). The cooled nontoxic flue gas may then be discharged as stack gas without polluting the environment.

One embodiment of the subject invention includes a power cogeneration feature with a steam turbine. Boiler feed water is passed through a coil in the HRSG in indirect heat exchange with the expanded flue gas. Steam at a pressure in the range of about 1000 to 2000 psig is produced and is passed through an expansion turbine as the working fluid. The expansion turbine drives a rotary mechanical and/or electrical device such as a compressor, pump, or electric generator. The spent wet steam is introduced into a condenser where it is fully condensed. The condensate in admixture with any make-up boiler feed water is pumped back to the HRSG.

In another embodiment, as shown in FIG. 2, the stream of clean chlorine and sulfur-free fuel gas leaving the acid gas removal zone at a temperature in the range of about 90° to 120° F. is saturated with hot water in a conventional water saturator so as to provide the fuel gas with about 5 to 15 wt. % of $H_2O$. When humidified clean chlorine and sulfur-free fuel gas is burned with air in the combustor of a gas turbine, nitrous oxides ($NO_4$) in the flue gas are substantially reduced. Increased power and efficiencies are obtained without polluting the atmosphere. This feature is shown in section "D"—"D" of FIG. 2 which replaces section "C"—"C" in FIG. 1. Aside from this feature, the embodiments shown in FIGS. 1 and 2 are substantially the same. As shown in FIGS. 1 and 2, the saturated fuel gas stream at a temperature in the range of about 250° to 350° F. is further heated to a temperature in the range of about 250° to 400° F. by indirect heat exchange with steam in a conventional heat exchanger shown in FIG. 1. Steam is thereby condensed. The clean humidified chlorine and sulfur-free fuel gas is further heated to a temperature in the range of about 400° F. to 800° F. by indirect heat exchange with the raw fuel gas stream B in a conventional heat exchanger, as shown in FIG. 1. At least a portion e.g. 90 to 100 volume % of this clean humidified chlorine and sulfur-free fuel gas stream comprising $H_2+CO$ is burned with air by complete combustion in the presence of dry $N_2$ in the combustor of a gas turbine in the manner described previously and as shown in FIG. 1. The remainder, if any, of the clean humidified chlorine and sulfur-free fuel gas substantially comprising $H_2$ and CO may be used elsewhere. For example, the CO in this gas stream may be reacted with water over a water-gas shift catalyst to provide a stream of synthesis gas containing an increased amount of hydrogen. $CO_2$ may be removed from the water-gas shifted gas stream by means of a conventional solvent.

Water at a temperature in the range of about 120° F. to 150° F. is pumped from the fuel gas saturator in FIG. 2 and reheated to a temperature in the range of about 250° F. to 350° F. by indirect heat exchange in a conventional convection type heat exchanger with the combined stream of scrubbed raw fuel gas A and B which enters saturator heater (a) at a temperature in the range of about 250° F. to 500° F. and is cooled to a temperature in the range of about 200° F. to 400° F. Further cooling of the combined stream of scrubbed raw fuel gas A and B to a temperature in the range of about 120° F. to 250° F. takes place in convection cooler (b) by indirect heat exchange with boiler feed water, followed by still further cooling to a temperature in the range of about 90° F. to 120° F. by indirect heat exchange with cooling water in convection cooler (c). $H_2S$ and COS are removed from the combined stream of scrubbed raw fuel gas A and B in the acid gas recovery zone to produce the stream of clean chlorine and sulfur-free fuel gas which is then saturated with water as previously described.

DESCRIPTION OF THE DRAWING

A more complete understanding of the invention may be had by reference to the accompanying schematic drawing which shows in FIGS. 1 and 2 two embodiments of the process in detail. Although FIG. 1 of the drawing illustrates a preferred embodiment of the process of this invention, it is not intended to limit the continuous process illustrated to the particular apparatus or materials described.

As shown in FIG. 1 of the drawing, vertical free-flow non-catalytic refractory lined fuel gas generator 1 is equipped with axially aligned upstream flanged inlet port 2 and downstream flanged exit port 3. Annulus type burner 4, with center passage 5 in alignment with the central longitudinal axis of gas generator 1 is mounted in inlet port 2. Central passage 5 has an upstream end 6 connected to a stream of free-oxygen containing gas, e.g. substantially pure oxygen in line 7. For example, air may be separated in a conventional air separation unit (not shown) into substantially pure oxygen in line 7 and dry nitrogen gas in line 10. A pumpable aqueous slurry of solid carbonaceous fuel in line 11 comprises in this embodiment an aqueous slurry of Pittsburg No. 8 coal having a solids content in the range of about 62 to 66 wt.%, a sulfur content of about 2–3 wt. % sulfur (dry basis), and a chlorine content of about 0.1 wt. % chlorine (dry basis) is passed through inlet 15 of burner 4 and down through concentric annular passage 16. The two feedstreams emerging from the downstream tip of burner 4 impact together, atomize, and react by partial oxidation in reaction zone 17 to produce fuel gas.

A conventional radiant cooler 18 comprising upstream central flanged inlet 19, downstream central flanged outlet 20, vertical water tube bundle 21, flanged inlet 22 through which boiler feed water in line 23 is introduced into the bottom of water tube bundle 21, flanged outlet 24 through which steam leaves from the top of cylindrically shaped water tube bundle 21 by way of line 25, flanged outlets 26 and 27 through which the split streams of partially cooled raw fuel gas A and B leave through lines 28 and 29, respectively. Flanged exit port 3 of fuel gas generator 1 and flanged inlet port 19 of radiant cooler 18 are connected along the central axes of the generator 1 and cooler 18. The fuel gas produced in reaction zone 17 passes freely down through cylindrically shaped refractory lined connecting passage 30 and is cooled by indirect radiant heat exchange with boiler feed water passing up through vertical tube bundle 21. Frusto-conical shaped baffles 31 direct the partially cooled fuel gas out through outlets 26 and 27. Slag and ash are collected in a pool of cooling water 32 at the bottom of radiant cooler 18. Periodically, by means of a conventional lock-hopper (not shown) slag, ash and water are removed through outlet 20, line 33, valve 34, and line 35.

The split stream of partially cooled raw fuel gas A in line 28 is cooled in convection cooler 40 by indirect heat exchange with boiler feed water which enters cooler 40 through line 42 and leaves as steam through line 42. Additional cooling of raw fuel gas A in line 43 takes place in convection cooler 44 by indirect heat exchange between dry nitrogen gas from line 45. The heated dry nitrogen gas leaves cooler 44 through line 46, and is passed through control valve 47, line 48 and is separately introduced into combustor 50. Dry nitrogen gas from line 10 is passed through line 51, valve 52, lines 53 and 45 into convection heat exchanger 44. Alternatively, the dry nitrogen gas from line 10 is passed through line 54, valve 55, line 56 and is heated in convection heat exchanger 57 by indirect heat exchange with steam which enters through line 58 and leaves through line 59. The dry nitrogen gas is passed through lines 60, 45 and cooler 44.

The cooled raw fuel gas A leaves cooler 44 through line 65 and is introduced into water scrubber 66 where it is scrubbed clean with water. Scrubbing water is introduced into the top of scrubber 66 by way of line 67. A dispersion of water, particulate matter, and HCl leaves scrubber 66 through bottom line 68 and is sent to a conventional water reclamation zone (not shown). The stream of clean chlorine-free fuel gas A leaving overhead from scrubber 66 through line 69 is mixed in line 70 with a stream of clean chlorine-free fuel gas B from line 71 which was derived in the following manner. The split stream of partially cooled raw fuel gas B in line 29 is cooled in convection cooler 72 by indirect heat exchange with boiler feed water which enters cooler 72 through line 73 and leaves as steam through line 74. Additional cooling of raw fuel gas B in line 75 takes place in convection cooler 76 by indirect heat exchange with clean chlorine and sulfur-free fuel gas which enters cooler 76 through line 77 and leaves at a higher temperature through line 78. The cooled raw fuel gas B leaving cooler 76 by way of line 85 is introduced into scrubber 86 where it is scrubbed with water to remove substantially all of the chlorine-containing materials and particulate matter. Water enters through line 87 at the top of scrubber 86 and leaves through line 88 at the bottom. Clean chlorine and sulfur-free fuel gas leaves scrubber 86 through overhead line 71 and enters block "C"—"C". In block "C"—"C" of FIG. 1, the fuel gas mixture in line 70 comprising the stream of clean chlorine-free fuel gas A from line 69 and the stream of clean chlorine-free fuel gas B from line 71 is cooled and desulfurized.

Accordingly, the clean chlorine-free fuel gas mixture in line 70 is progressively cooled to lower temperatures by indirect heat exchange in a plurality of conventional convection coolers connected in series. For example, in cooler (a), the clean chlorine-free fuel gas mixture A+B is passed in indirect heat exchange with clean chlorine and sulfur-free fuel gas leaving the acid gas removal zone (AGR) in line 90. After being heated in heat exchanger (a), the stream of clean chlorine and sulfur-free fuel gas in line 91 leaves block "C"—"C" and enters heater 92. Steam enters convection heater 92 through line 93 and leaves through line 94. Further heating of this stream of clean chlorine and sulfur-free fuel gas in cooler 76 and introducing it into combustor 50 has been previously described.

The clean chlorine-free fuel gas stream leaving heat exchanger (a) by way of line 94 is further cooled in convection cooler (b) by indirect heat exchange with circulating boiler water which enters cooler (b) through line 95 and leaves through line 96. Clean chlorine-free fuel gas leaving heat exchanger (b) through line 97 is further cooled in convection cooler (c) by indirect heat exchange with cold water which enters cooler (c) through line 98 and leaves through line 99. Substantially all of the sulfur-containing gases e.g. $H_2S$ and COS in the clean chlorine-free fuel gas in line 100 are removed in conventional acid gas removal zone (AGR) 110. The sulfur-containing gases are stripped from the solvent and sent to a conventional sulfur-recovery zone by way of line 111, valve 112, and line 113. At least a portion of the clean chlorine and sulfur-free fuel gas in line 78 is passed through control valve 113 and separately introduced through line 114 into combustor 50. The remainder of the clean chlorine and sulfur-free fuel gas, substantially comprising $H_2$ and CO, is passed through line 115, valve 116, and line 117 for use in other applications such as gaseous fuel for complete combustion in a boiler or furnace, conversion to $H_2$-rich gas, organic synthesis, and reducing gas.

Air is passed through line 118, control valve 119, and line 120 into combustor 50. The gaseous fuel is burned in the presence of dry nitrogen in combustor 50 to produce flue gas in line 121. The flue gas is passed through expansion turbine 122 as the working fluid. Rotating shaft 123 drives electric generator 124. Hot turbine exhaust gas in line 125 is passed through conventional heat recovery steam generator 126 where by indirect heat exchange in coils 127, boiler feed water from line 128 is converted into steam in line 129. The steam is the working fluid in steam turbine 130. Rotating shaft 131 is driven by turbine 130 and in turn rotates electric generator 132. Exhaust steam leaves through line 133.

In another embodiment of the subject process as shown in FIG. 2, in block "D"—"D" the combined cleaned chloride-free fuel gas streams A+B is desulfurized in an acid-gas recovery zone (AGR). Then, the chlorine and sulfur-free stream of fuel gas leaving the AGR is saturated with water and heated to provide the fuel gas stream containing about 5 to 15 wt. % moisture in line 191. In this second embodiment, block "D" "D" of FIG. 2 replaces block "C"—"C" of FIG. 1. Except for water saturating fuel gas, and changing the coolant in heat exchanger (a), all of the other features of the second embodiment in FIG. 2 are substantially the same as those shown in FIG. 1. The water saturated clean chlorine and sulfur-free fuel gas stream which departs block "D"—"D" by way of line 191 is introduced into convection heater 92 shown in FIG. 1 in place of the dry clean chlorine and sulfur-free fuel gas stream 91 that is produced in the first embodiment block "C"—"C".

Accordingly, in block "D"—"D", the clean chlorine-free fuel gas stream A in line 69 is passed through valve 199 and line 200 and mixed in line 201 with clean chlorine-free fuel gas stream B from line 71 of FIG. 1, valve 202 and line 203. The combined fuel gas stream A+B in line 201 is then cooled by the following step wise heat exchange in two or more convection coolers. Thus, in conventional convection cooler (a) the combined stream of clean chlorine-free fuel gas in line 201 is passed in indirect heat exchange with water which enters fuel gas cooler (a) through line 204, leaves through line 205, and is circulated by means of pump 207 to the top of fuel gas saturator heater 208. The water in saturator 208 contacts and saturates with water, the stream of clean chlorine and sulfur-free fuel gas which enters saturator 208 by way of bottom line 222 and leaves through line 191 at the top. Cooled water leaves saturator 208 by way of line 206. Circulating pump 207 pumps the water from line 206. Make-up water from line 209, valve 210, and line 211 is pumped through line 204 to heat exchanger (a) where it is heated. The combined clean chlorine-free fuel gas leaving cooler (a) through line 212 is further cooled in convection cooler (b) and (c), which are connected in series. Thus, boiler feed water enters heat exchanger (b) through line 213 and leaves as steam through line 214. The cooled clean chlorine-free fuel gas in line 215 is further cooled in (c) by indirect heat exchange with cold water which enters cooler (c) by way of line 216 and leaves as warm water through line 217. Substantially all of the sulfur-containing gases e.g. $H_2S$ and COS are removed from the clean chlorine-free fuel gas stream that enters the conventional acid gas removal zone (AGR) 223 by way of line 218. $H_2S$ and COS are stripped from the organic solvent that contacts the fuel gas in the AGR and are sent to a conventional sulfur-recovery zone by way of line 219, valve 220, and line 221.

Various modifications of the invention as herein before set forth may be made without departing from the spirit and scope thereof, and therefore, only such limitations should be made as are indicated in the appended claims.

We claim:

1. A process for the generation of power comprising the steps:
    (1) reacting by partial oxidation a stream of free-oxygen containing gas with a stream of chlorine and sulfur-containing liquid hydrocarbonaceous or solid carbonaceous fuel in the presence of a temperature moderator in the reaction zone of a downflowing vertical free-flow gas generator to produce a stream of raw fuel gas comprising $H_2$, CO, $CO_2$, $H_2O$, $H_2S$, COS, HCl, $CH_4$, and A, along with entrained molten slag and particulate matter; wherein the temperature in said reaction zone is above the dew point of $H_2O$ in said steam of raw fuel gas;
    (2) cooling said raw fuel gas stream from step (1) to a temperature above the dew point of $H_2O$ in said steam of raw fuel gas by indirect heat exchange with boiler circulating water; and separating out said slag;
    (3) splitting the slag-free raw fuel gas stream from step (2) into separate gas streams A and B, and separately cooling each raw fuel gas stream A and, B to a temperature above the dew point of $H_2O$ in said separate gas steams by indirect heat exchange with boiler circulating water, thereby producing steam;
    (4) passing a stream of nitrogen gas in indirect heat exchange with the raw fuel gas stream A from step (3), thereby further cooling said raw fuel gas stream A to a temperature above the dew point of $H_2O$ in said raw fuel gas stream A while heating the nitrogen gas stream;
    (5) scrubbing the stream of raw fuel gas A that was cooled in step (4) with water to produce a clean chlorine-free stream of fuel gas;
    (6) further cooling the raw fuel gas stream B from step (3) to a temperature above the dew point of $H_2O$ in said raw fuel gas stream B by indirect heat exchange with a stream of clean water saturated chlorine and sulfur-free fuel gas leaving subsequent step (13) thereby heating said clean chlorine and sulfur-free fuel gas stream;
    (7) scrubbing with water the cooled stream of raw fuel gas B that was cooled in step (6) produce a clean chlorine-free stream of fuel gas;
    (8) combining the streams of clean chlorine-free fuel gas A and B from steps (5) and (7) respectively;
    (9) cooling the combined stream of clean chlorine-free fuel gas from step (8) by indirect heat exchange with a clean chlorine and sulfur-free stream of fuel gas from subsequent step (11);
    (10) further cooling the combined stream of raw fuel gas from step (9) by indirect heat exchange with boiler circulating water and/or cold water in one or more heat exchangers;
    (11) removing substantially all of the sulfur-containing gases from the combined stream of clean chlorine-free fuel gas from step (10) in an acid-gas removal zone;
    (12) saturating with water the chlorine and sulfur-free fuel gas stream from step (11);
    (13) heating to a temperature in the range of about 250° F. to 400° F., said clean water saturated stream of chlorine and sulfur-free fuel gas from step (12) by indirect heat exchange with steam;
    (14) introducing the following gaseous streams into the combustion zone of a gas turbine: (a) a stream of air, (b) the stream of nitrogen gas heated in step (4), and (c) at least a portion of the stream of clean water saturated chlorine and sulfur-free fuel gas heated in step (6); and
    (15) burning said portion of the stream of clean water saturated chlorine and sulfur-free fuel gas in said combustion zone to produce flue gas substantially free from HCl, sulfur-containing gas, and $NO_x$; and passing said flue gas through an expansion turbine to produce power.

2. The process of claim 1 provided with the steps of passing the flue gas leaving said expansion turbine in step (15) through a convection heater in indirect heat exchange with boiler feed water which is converted into steam, and passing said steam through a steam turbine for the production of mechanical and electrical power.

3. The process of claim 1 wherein from about 10 to 100 volume % of the stream of clean water saturated chlorine and sulfur-free fuel gas heated in step (6) is introduced into the combustion zone in step (14); and provided with the step of catalytically reacting the remainder of said stream of clean water saturated chlorine and sulfur-free fuel gas substantially comprising $H_2$+CO to produce organic chemicals or a $H_2$-rich gas stream.

4. A process for the generation of power comprising the steps of:
    (1) reacting by partial oxidation a stream of free-oxygen containing gas with a stream of chlorine and sulfur-containing liquid hydrocarbonaceous or solid carbonaceous fuel in the presence of a temperature moderator in the reaction zone of a downflowing vertical free-flow gas generator at a temperature in the range of about 1800° F. to 3000° F. and a pressure in the range of about 1 to 250 atmospheres to produce a stream of raw fuel gas comprising $H_2$, $CO$, $CO_2$, $H_2O$, $H_2S$, $COS$, $HCl$, $CH_4$, and A, along with entrained molten slag and particulate matter; wherein the temperature in said reaction zone is above the dew point of $H_2O$ in said steam of raw fuel gas;

(2) cooling said raw fuel gas stream from step (1) to a temperature in the range of 1500° F. to 1000° F. and above the dew point of $H_2O$ in said steam of raw fuel gas by indirect heat exchange with boiler circulating water; and separating out said slag;

(3) splitting the slag-free raw fuel gas stream from step (2) into separate gas streams A and B, and separately cooling each raw fuel gas stream A and B to a temperature above the dew point of $H_2O$ is said separate gas streams by indirect heat exchange with boiler circulating water, thereby producing steam;

(4) passing a stream of dry nitrogen gas at a temperature in the range of about ambient to 400° F. in indirect heat exchange with the raw fuel gas stream A from step (3), thereby further cooling said raw fuel gas stream A to a temperature in the range of about 600° to 300° F. and above the dew point of $H_2O$ in said raw fuel gas stream A while heating the nitrogen gas stream to a temperature in the range of about 400° to 800° F.;

(5) scrubbing the stream of raw fuel gas A that was cooled in step (4) with water to produce a clean chlorine-free stream of fuel gas;

(6) further cooling the raw fuel gas stream B from step (3) to a temperature about 600° F. to 300° F. and above the dew point of water in said raw fuel gas stream B by indirect heat exchange with a stream of clean water saturated chlorine and sulfur-free fuel gas leaving subsequent step (13) whereby heating said clean chlorine and sulfur-free fuel gas stream to a temperature in the range of about 400° F. to 800° F.;

(7) scrubbing with water the cooled stream of raw fuel gas B that was cooled in step (6) to produce a clean chlorine-free stream of fuel gas;

(8) combining the streams of clean chlorine-free fuel gas A and B from steps (5) and (7) respectively;

(9) cooling the combined stream of clean chlorine-free fuel gas from step (8) having a temperature in the range of about 250° F. to 500° F. to a temperature in the range of about 200° F. to 400° F. by indirect heat exchange with a clean chlorine and sulfur-free stream of fuel gas from subsequent step (11) having a temperature in the range of about 90° F. to 120° F.;

(10) further cooling the combined stream of raw fuel gas from step (9) to a temperature in the range of about 90° F. to 120° F. by indirect heat exchange with boiler circulating water and/or cold water in one or more heat exchangers;

(11) removing substantially all of the sulfur-containing gases from the combined stream of clean chlorine-free fuel gas from step (10) an acid-gas removal zone;

(12) saturating water the chlorine and sulfur-free fuel gas stream from step (11);

(13) heating to a temperature in the range of about 250° F. to 400° F., said clean water saturated stream of chlorine and sulfur-free fuel gas from step (12) by indirect heat exchange with steam;

(14) separately introducing the following gaseous streams into the combustion zone of a gas turbine by way of separate lines (a) a stream of air, (b) the stream of nitrogen gas heated in step (4), and (c) the stream of clean and water saturated chlorine and sulfur-free fuel gas heated in step (6); and

(15) burning said clean water saturated chlorine and sulfur-free fuel gas in said combustion zone to produce flue gas substantially free from HCl, sulfur-containing gas, and $NO_x$; and passing said flue gas through an expansion turbine to produce power and hot exhaust gas; producing steam by indirect heat exchange of boiler feed water with said hot exhaust gas; and passing said steam through a steam turbine for the production of power.

5. A process for the generation of power comprising the steps:

(1) reacting by partial oxidation a stream of free-oxygen containing gas with a stream of chlorine and sulfur-containing liquid hydrocarbonaceous or solid carbonaceous fuel in the presence of a temperature moderator in the reaction zone of a downflowing vertical free-flow gas generator at a temperature in the range of about 1800° to 3000° F. and a pressure in the range of about 1 to 250 atmospheres to produce a stream of raw fuel gas comprising $H_2$, $CO$, $CO_2$, $H_2O$, $H_2S$, $COS$, $HCl$, $CH_4$, and A, along with entrained molten slag and particulate matter; wherein the temperature in said reaction zone is above the dew point of $H_2O$ in said steam of raw fuel gas;

(2) cooling said raw fuel gas stream from step (1) to a temperature in the range of about 1500° to 1000° F. and above the dew point of $H_2O$ in said stream of raw fuel gas by indirect heat exchange with boiler circulating water; and separating out said slag;

(3) splitting the slag-free raw fuel gas stream from step (2) into separate gas streams A and B, and separately cooling each raw fuel gas stream A and B to a temperature in the range of about 1000° to 600° F. and above the dew point of $H_2O$ in said separate steams by indirect heat exchange with boiler circulating water, thereby producing steam;

(4) passing a stream of dry nitrogen gas at a temperature in the range of about ambient to 400° F. in indirect heat exchange with the raw fuel gas stream A from step (3), thereby further cooling said raw fuel gas stream A to a temperature in the range of about 600° to 300° and above the dew point of $H_2O$ in said raw fuel gas stream A while heating the nitrogen gas stream to a temperature in the range of about 400° to about 800° F.;

(5) scrubbing the stream of raw fuel gas A that was cooled in step (4) with water to produce a clean chlorine-free stream of fuel gas;

(6) further cooling the raw fuel gas stream B from step (3) to a temperature about 600° F. to 300° F. and above the dew point of $H_2O$ in said raw fuel gas stream B by indirect heat exchange with a stream of clean chlorine and sulfur-free fuel gas leaving subsequent step (12) thereby heating said clean chlorine and sulfur-free fuel gas stream to a temperature in the range of about 400° F. to 800° F.;

(7) scrubbing with water the cooled stream of raw fuel gas B that was cooled in step (6) to produce a clean chlorine-free stream of fuel gas;

(8) combining the streams of clean chlorine-free fuel gas A and B from steps (5) and (7) respectively;

(9) cooling the combined stream of clean chlorine-free fuel gas from step (8) having a temperature in the range of about 250° F. to 500° F. to a temperature in the range of about 200° F. to 400° F. by indirect heat exchange with a clean chlorine and sulfur-free stream of fuel gas from subsequent step (11) having a temperature in the range of about 90° F. to 120° F.;

(10) further cooling the combined stream of raw fuel gas from step (9) to a temperature in the range of about 90° F. to 120° F. by indirect heat exchange with boiler circulating water and/or cold water in one or more heat exchangers;

(11) removing substantially all of the sulfur-containing gases from the combined stream of clean chlorine-free fuel gas from step (10) in an acid-gas removal zone;

(12) heating to a temperature in the range of about 250° F. to 400° F., said stream of clean chlorine and sulfur-free fuel gas from step (9) by indirect heat exchange with steam;

(13) separately introducing the following gaseous streams into the combustion zone of a gas turbine by way of separate lines (a) a stream of air, (b) the stream of nitrogen gas heated in step (4), and (c) at least a portion of the stream of clean chlorine and sulfur-free fuel gas heated in step (6); and

(14) burning said portion of the steam of clean chlorine and sulfur-free fuel gas in said combustion zone to produce flue gas substantially free from HCl, sulfur-containing gas, and $NO_x$; and passing said flue gas through an expansion turbine to produce power and hot exhaust gas; producing steam by indirect heat exchange of boiler feed water with said hot exhaust gas; and passing said steam through a steam turbine for the production of power.

6. A process for the generation of power comprising the steps:

(1) reacting by partial oxidation a stream of free-oxygen containing gas with a stream of chlorine and sulfur-containing liquid hydrocarbonaceous or solid carbonaceous fuel in the presence of a temperature moderator in the reaction zone of a downflowing vertical free-flow gas generator to produce a stream of raw fuel gas comprising $H_2$, CO, $CO_2$, $H_2O$, $H_2S$, COS, HCl, $CH_4$, and A, along with entrained molten slag and particulate matter; wherein the temperature in said reaction zone is above the dew point of $H_2O$ in said stream of raw fuel gas;

(2) cooling said raw fuel gas stream from step (1) to a temperature above the dew point of $H_2O$ in said stream of raw fuel gas indirect heat exchange with boiler circulating water; and separating out said slag;

(3) splitting the slag-free raw fuel gas stream from step (2) into separate gas streams A and B, and separately cooling each raw fuel gas stream A and B to a temperature above the dew point of $H_2O$ in said separate gas streams by indirect heat exchange with boiler circulating water, thereby producing steam;

(4) passing a stream of nitrogen gas in indirect heat exchange with the raw fuel gas stream A from step (3), thereby further cooling said raw fuel gas stream A to a temperature above the dew point of water in said raw fuel gas stream A while heating the nitrogen gas stream;

(5) scrubbing the stream of raw fuel gas A that was cooled in step (4) with water to produce a clean chlorine-free stream of fuel gas;

(6) further cooling the raw fuel gas stream B from step (3) to a temperature above the dew point of water in said raw fuel gas stream B by indirect heat exchange with a stream of clean humidified chlorine and sulfur-free fuel gas leaving subsequent step (12) thereby heating said clean chlorine and sulfur-free fuel gas stream;

(7) scrubbing with water the cooled stream of raw fuel gas B that was cooled in step (6) to produce a clean chlorine-free stream of fuel gas;

(8) combining the streams of clean chlorine-free fuel gas A and B from step (5) and step (7) respectively;

(9) cooling the combined stream of clean chlorine-free fuel gas from step (8) by indirect heat exchange with a clean chlorine and sulfur-free stream of fuel gas from subsequent step (11);

(10) further cooling the combined stream of raw fuel gas from step (9) by indirect heat exchange with boiler circulating water and/or cold water in one or more heat exchangers;

(11) removing substantially all of the sulfur-containing gases from the combined stream of clean chlorine-free fuel gas from step (10) in an acid-gas removal zone;

(12) heating said stream of clean chlorine and sulfur-free fuel gas from step (9) by indirect heat exchange with steam;

(13) introducing the following gaseous streams into the combustion zone of a gas turbine: (a) a stream of air, (b) the stream of nitrogen gas heated in step (4), and (c) at least a portion of the stream of clean chlorine and sulfur-free fuel gas heated in step (6); and

(14) burning said portion of the steam of clean chlorine and sulfur-free fuel gas in said combustion zone to produce flue gas substantially free from HCl, sulfur-containing gas, and $NO_2$; and passing said flue gas through an expansion turbine to produce power.

7. The process of claim 6 provided with the steps of passing the exhaust flue gas leaving said expansion turbine in step (14) through a convection heater in indirect heat exchange with boiler feed water which is converted into steam, and passing said steam through a steam turbine for the production of mechanical and electrical power.

8. The process of claim 1 wherein from about 10 to 100 volume % of the stream of clean chlorine and sulfur-free fuel gas heated in step (6) is introduced into the combustion zone in step (13); and provided with the step of catalytically reacting the remainder of said stream of clean chlorine and sulfur-free fuel gas substantially comprising $H_2+CO$ to produce organic chemicals or a $H_2$-rich gas stream.

9. The process of claim 6 wherein said chlorine and sulfur-containing liquid hydrocarbonaceous or solid carbonaceous fuel contain about 0.2 to 10 wt. % (dry basis) of sulfur and about 10 to 20,000 parts per million (dry basis) of chlorine.

10. The process of claim 9 wherein said chlorine is present as a chloride selected from the group consisting of sodium, potassium, magnesium, and mixtures thereof; and said sulfur is present as a sulfide selected from the group consisting of iron, zinc, copper-iron, lead, and mixtures thereof and/or as sulfates selected from the group consisting of calcium, barium, iron, sodium, aluminum, and mixtures thereof.

11. The process of claim 6 wherein gas stream A comprises 30 to 70 volume % of the slag-free raw fuel gas stream from step (2) and gas stream B comprises the remainder.

12. The process of claim 6 wherein the scrubbing water in steps (5) and (7) is at a temperature in the range of about 250° F. to 450° F. and has a pH in the range of about 6 to 9.

13. The process of claim 12 provided with the addition to the water of a base material selected from the group consisting of $NH_3$, $NH_4OH$, NaOH, KOH, $Na_2CO_3$ and $K_2CO_3$.

14. The process of claim 6 wherein said solid carbonaceous fuel is selected from the group consisting of coal, such as anthracite, bituminous, subbituminous, coke from coal; lignite; residue derived from coal liquefaction; oil shale; tar sands; petroleum coke; asphalt; pitch; particulate carbon; soot; concentrated sewer sludge; and mixtures thereof.

15. The process of claim 6 wherein said liquid hydrocarbonaceous fuel is selected from the group consisting of liquefied petroleum gas, petroleum distillates and residua, gasoline, naphtha, kerosene, crude petroleum, asphalt, gas oil, residual oil, tar-sand oil, shale oil, oil derived from coal, aromatic hydrocarbons (such as benzene, toluene, and xylene fractions), coal tar, cycle gas oil from fluid-catalytic-cracking operations, furfural extract of coker gas oil, and mixtures thereof.

16. The process of claim 6 wherein said free-oxygen containing gas is selected from the group consisting of air, oxygen-enriched air, substantially pure oxygen, and mixtures thereof.

* * * * *